US012536950B2

(12) United States Patent
Han et al.

(10) Patent No.: US 12,536,950 B2
(45) Date of Patent: Jan. 27, 2026

(54) LIGHT EMITTING DISPLAY APPARATUS

(71) Applicant: LG Display Co., Ltd., Seoul (KR)

(72) Inventors: JunHee Han, Paju-si (KR); JeongHwan Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/503,011

(22) Filed: Nov. 6, 2023

(65) Prior Publication Data

US 2024/0257722 A1 Aug. 1, 2024

(30) Foreign Application Priority Data

Jan. 30, 2023 (KR) ........................ 10-2023-0012056

(51) Int. Cl.
*G09G 3/32* (2016.01)
*G09G 3/00* (2006.01)

(52) U.S. Cl.
CPC ............... *G09G 3/32* (2013.01); *G09G 3/006* (2013.01); *G09G 2310/0267* (2013.01); *G09G 2320/041* (2013.01); *G09G 2320/043* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 2005/0206969 A1* | 9/2005 | Murade | G09G 3/3688 | 358/497 |
| 2013/0050157 A1* | 2/2013 | Baek | G09G 3/2092 | 345/204 |
| 2015/0108437 A1* | 4/2015 | Cho | G09G 3/3233 | 257/40 |

* cited by examiner

*Primary Examiner* — Matthew Yeung
(74) *Attorney, Agent, or Firm* — Seed Intellectual Property Law Group LLP

(57) ABSTRACT

A light emitting display apparatus in which non-display light emitting devices are provided in a non-display area provided with a gate driver is provided. The light emitting display apparatus includes a light emitting display panel divided into a display area provided with pixels including light emitting devices and a non-display area provided outside the display area and a power supply supplying power to the light emitting display panel, wherein a gate driver for supplying gate pulses to gate lines provided in the light emitting display panel is provided in the non-display area, and a non-display light emitting device is connected to a non-display transistor provided in the gate driver.

20 Claims, 9 Drawing Sheets

LIGHT EMITTING DISPLAY APPARATUS

CROSS-REFERENCE TO RELATED APPLICATIONS

This application claims the benefit of the Korean Patent Application No. 10-2023-0012056 filed on Jan. 30, 2023, which is hereby incorporated by reference as if fully set forth herein.

BACKGROUND

Technical Field

The present disclosure relates to a light emitting display apparatus.

Description of the Related Art

A light emitting display apparatus performs a function of displaying an image by outputting light by itself.

Light emitting display apparatuses are mounted on electronic products such as televisions, monitors, notebook computers, smart phones, tablet computers, electronic pads, wearable devices, watch phones, portable information devices, navigation devices, or vehicle control display apparatus to perform a function of displaying images.

A light emitting display apparatus includes a display area in which an image is displayed and a non-display area in which an image is not displayed.

Pixels including light emitting devices are provided in the display area, and a gate driver may be provided in the non-display area. The description provided in the background section should not be assumed to be prior art merely because it is mentioned in or associated with the background section. The background section may include information that describes one or more aspects of the subject technology.

BRIEF SUMMARY

In order to test the quality of the light emitting display apparatus, an aging process of continuously driving and heating the light emitting display apparatus is carried out. That is, in the aging process, pixels provided in the light emitting display panel emit light, and thus, the temperature of the light emitting display panel rises. In a state in which the temperature is increased, whether the light emitting display panel is normally driven can be tested.

In this case, in order to test whether the gate driver provided in the non-display area operates normally, the temperature of the non-display area provided with the gate driver should be also increased.

During the aging process, the temperature of the display area may be increased to between 70 and 80 degrees Celsius by light emitting devices, but the temperature of the non-display area is only increased to about 55 degrees Celsius, and the temperature increasing speed of the non-display area is less than the temperature increasing speed of the display area. Accordingly, the test to detect whether the gate driver is defective may be delayed, and because the gate driver is not heated enough, it is difficult to accurately test whether the gate driver is defective.

Accordingly, the inventors of the present disclosure have invented a light emitting display apparatus capable of rapidly increasing the temperature of a non-display area provided with a gate driver.

Accordingly, the present disclosure can provide a light emitting display apparatus that substantially obviates one or more problems due to limitations and disadvantages of the related art.

An aspect of the present disclosure is directed to providing a light emitting display apparatus in which non-display light emitting devices are provided in a non-display area provided with a gate driver.

Additional advantages and features of the disclosure will be set forth in part in the description which follows and in part will become apparent to those having ordinary skill in the art upon examination of the following or may be learned from practice of the disclosure. The benefits and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including a light emitting display panel including a display area provided with pixels including light emitting devices and a non-display area provided outside the display area and a power supply supplying power to the light emitting display panel, wherein a gate driver for supplying gate pulses to gate lines provided in the light emitting display panel is provided in the non-display area, and a non-display light emitting device is connected to a non-display transistor provided in the gate driver.

It is to be understood that both the foregoing general description and the following detailed description of the present disclosure are example and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
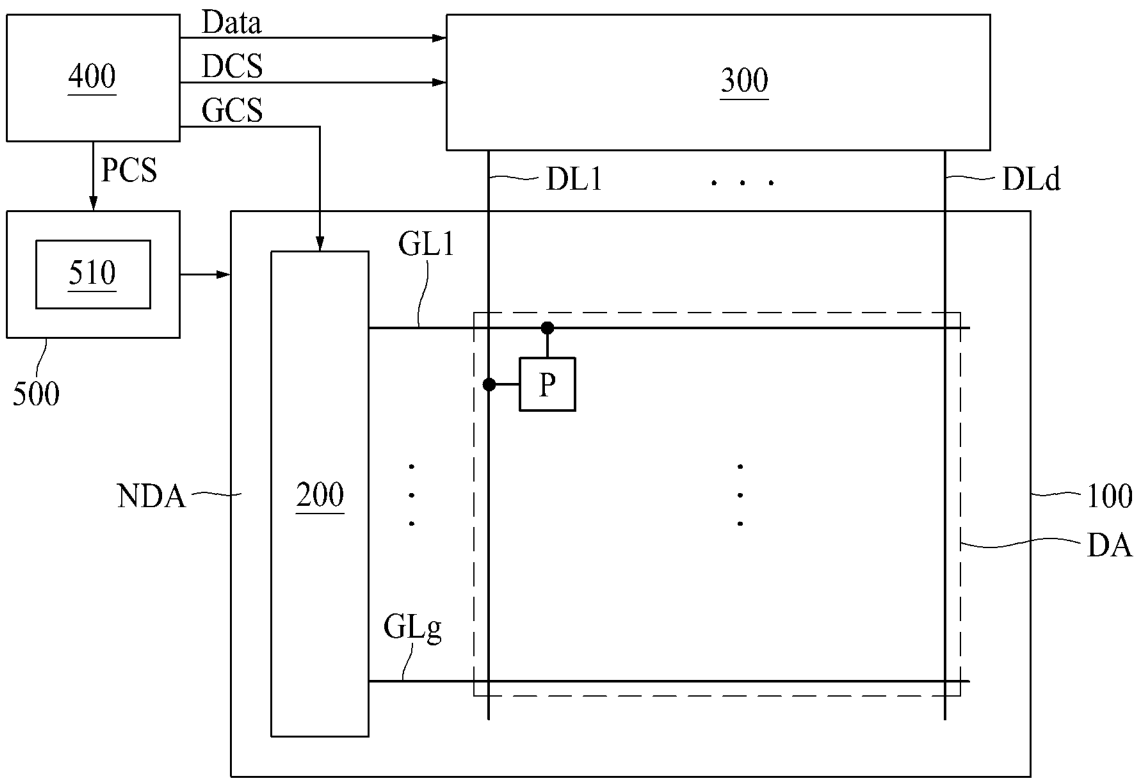
FIG. 1 is an example diagram illustrating a configuration of a light emitting display apparatus according to the present disclosure.

Reference will now be made in detail to the example embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element is "connected," "coupled," or "adhered" to another element or layer includes the meaning that the element or layer may be directly connected or adhered to another element or layer, and that the element or layer may be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
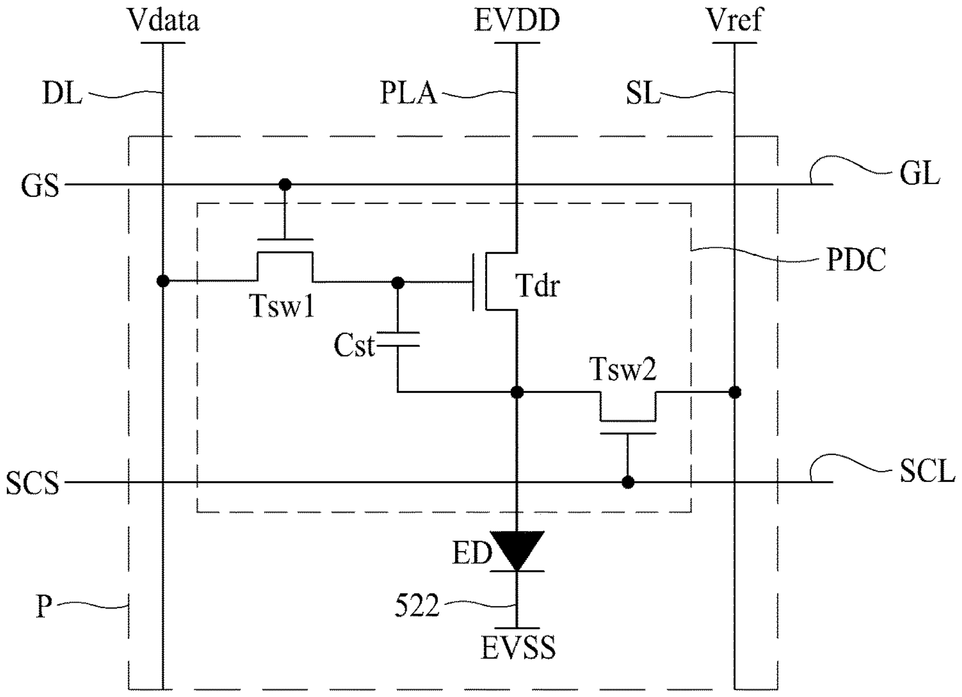
FIG. 2 is an example diagram illustrating a structure of a pixel applied to a light emitting display apparatus according to the present disclosure.
Figure 3:
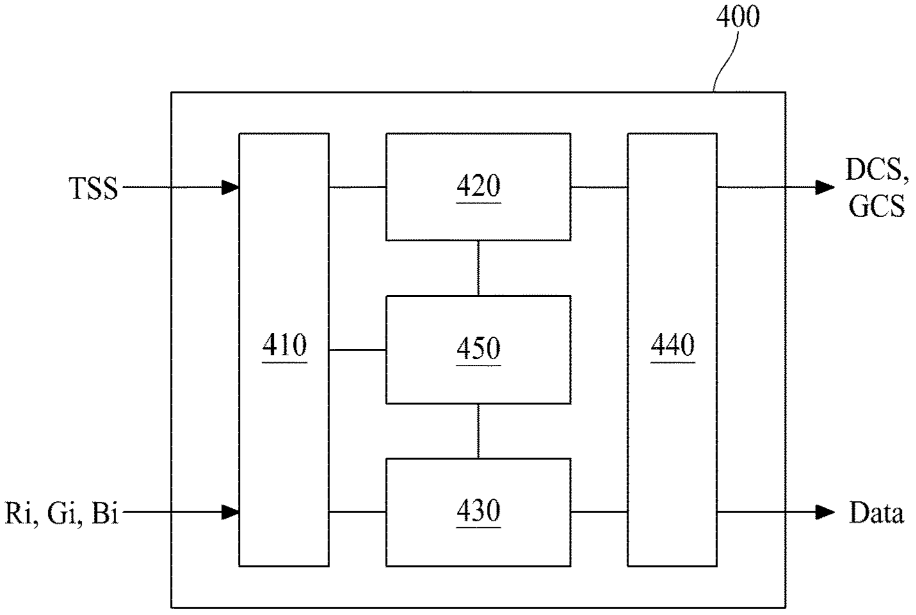
FIG. 3 is an example diagram illustrating a structure of a control driver applied to a light emitting display apparatus according to the present disclosure.
Figure 4:
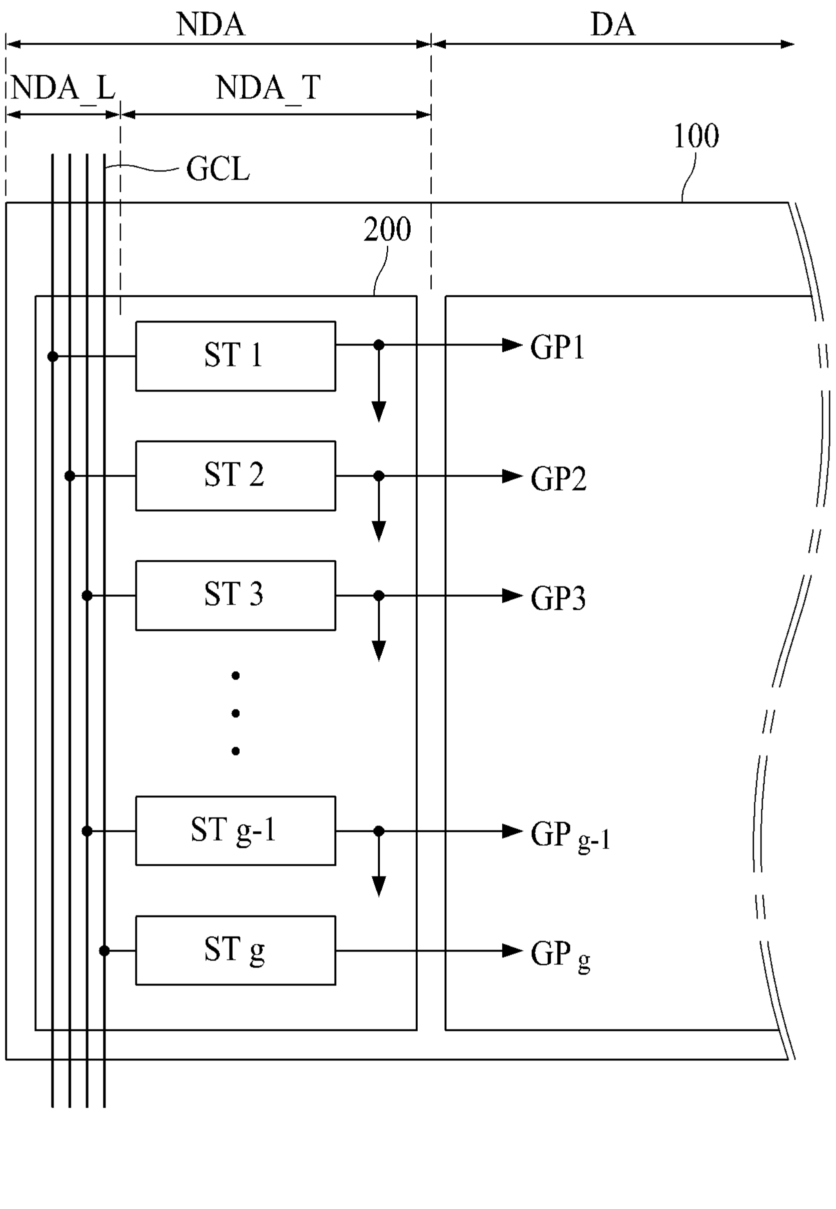
FIG. 4 is an example diagram illustrating a structure of a gate driver applied to a light emitting display apparatus according to the present disclosure.
Figure 5:
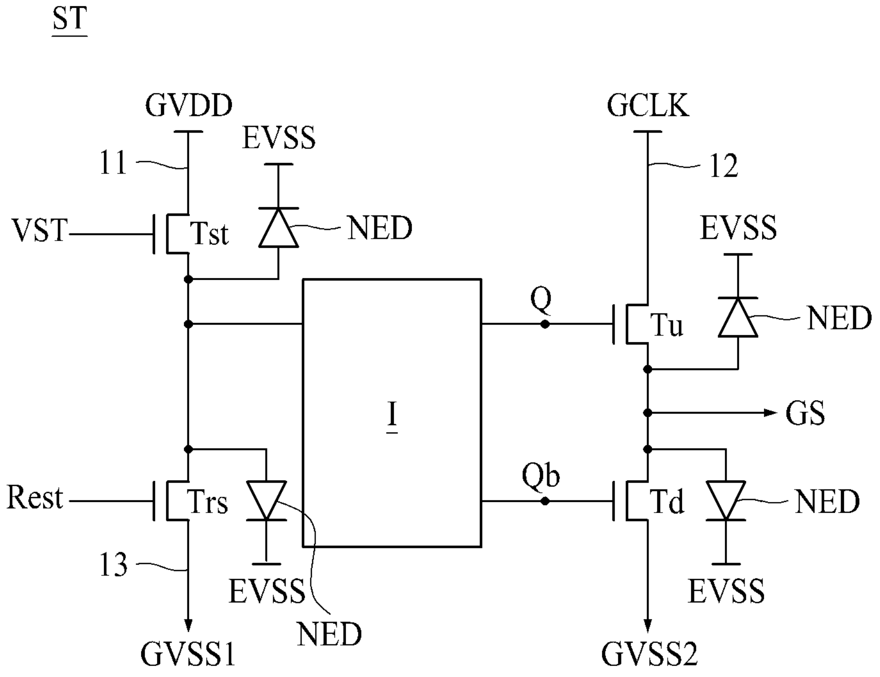
FIG. 5 is an example diagram schematically illustrating a structure of a stage illustrated in FIG. 4.

FIG. 1 is an example diagram illustrating a configuration of a light emitting display apparatus according to an embodiment of the present disclosure, FIG. 2 is an example diagram illustrating a structure of a pixel applied to a light emitting display apparatus according to an embodiment of the present disclosure, FIG. 3 is an example diagram illustrating a structure of a control driver applied to a light emitting display apparatus according to an embodiment of the present disclosure, FIG. 4 is an example diagram illustrating a structure of a gate driver applied to a light emitting display apparatus according to an embodiment of the present disclosure, and FIG. 5 is an example diagram schematically illustrating a structure of a stage illustrated in FIG. 4.

The display apparatus according to the present disclosure may configure various electronic devices. The electronic devices may include, for example, smartphones, tablet personal computers (PCs), televisions (TVs), and monitors.

The light emitting display apparatus according to an embodiment of the present disclosure, as illustrated in FIG. 1, may include a light emitting display panel 100 which includes a display area DA displaying an image and a non-display area NDA provided outside the display area DA, a gate driver 200 which supplies gate signals to a plurality of gate lines GL1 to GLg provided in the display area DA of the light emitting display panel 100, a data driver 300 which supplies data voltages Vdata to a plurality of data lines DL1 to DLd provided in the light emitting display panel 100, a control driver 400 which controls driving of the gate driver 200 and the data driver 300, and a power supply 500 which supplies power to the control driver 400, the gate driver 200, the data driver 300, and the light emitting display panel 100.

The light emitting display panel 100 includes a display area DA and a non-display area NDA. Gate lines GL1 to GLg, data lines DL1 to DLd, and pixels P are provided in the display area DA. Accordingly, an image is output in the display area DA. Here, g and d are natural numbers. The non-display area NDA surrounds the outer periphery of the display area DA.

The pixel P included in the light emitting display panel 100, as illustrated in FIG. 2, may include a pixel driving circuit PDC which includes a switching transistor Tsw1, a storage capacitor Cst, a driving transistor Tdr, and a sensing transistor Tsw2, and a light emitting device ED connected to the pixel driving circuit PDC. Embodiments are not limited thereto. As an example, one or more of the above-mentioned components (e.g., the sensing transistor Tsw2, the storage capacitor Cst, etc.) could be omitted, and/or one or more additional components (e.g., one or more transistor and/or one or more capacitor, etc.) may be further included.

A first terminal of the driving transistor Tdr may be connected to a first voltage supply line PLA through which a first voltage EVDD is supplied, and a second terminal of the driving transistor Tdr may be connected to the light emitting device ED.

A first terminal of the switching transistor Tsw1 may be connected to a data line DL, a second terminal of the switching transistor Tsw1 may be connected to a gate of the driving transistor Tdr, and a gate of the switching transistor Tsw1 may be connected to a gate line GL.

A data voltage Vdata may be supplied through the data line DL from the data driver 300. A gate signal GS may be supplied through the gate line GL from the gate driver 200. A gate signal GS may include a gate pulse for turning on the switching transistor Tsw1 and a gate-off signal for turning off the switching transistor Tsw1.

The sensing transistor Tsw2 may be provided for measuring a threshold voltage or mobility of the driving transistor, or for suppling a reference voltage Vref to the pixel driving circuit PDC. A first terminal of the sensing transistor Tsw2 may be connected to a second terminal of the driving transistor Tdr and the light emitting device ED, a second terminal of the sensing transistor Tsw2 may be connected to a sensing line SL through which the reference voltage Vref is supplied, and a gate of the sensing transistor Tsw2 may be connected to a sensing control line SCL through which a sensing control signal SCS is supplied.

The sensing line SL may be connected to the data driver 300, or may be connected to the power supply 500 through the data driver 300. That is, the reference voltage Vref supplied from the power supply 500 may be supplied to pixels P through the sensing line SL, and data sensing signals transferred through the sensing line SL from the pixels may be processed by the data driver 300.

The light emitting device ED may include a first electrode supplied with a first voltage EVDD through the driving transistor Tdr, a second electrode connected to a second cathode voltage line 522 supplied with a second voltage EVSS, and a light emitting layer provided between the first electrode and the second electrode.

A structure of the pixel P applied to the present disclosure is not limited to a structure illustrated in FIG. 2. Accordingly, a structure of the pixel P may be changed to various shapes.

The data driver 300 may supply data voltages to the data lines DL1 to DLd and may supply a reference voltage Vref to the sensing line SL. The data driver 300 may convert a data sensing signal received through the sensing line SL into a digital signal and transmits the digital signal to the control driver 400.

The controller 400 may realign input image data Ri, Gi, and Bi transferred from an external system by using a timing synchronization signal TSS transferred from the external system and may generate data control signals DCS which are to be supplied to the data driver 300 and gate control signals GCS which are to be supplied to the gate driver 200.

To this end, the controller 400 may include a data aligner 430 which realigns the pieces of input image data Ri, Gi, and Bi to generate pieces of image data Data and supplies the pieces of image data Data to the data driver 300, a control signal generator 420 which generates the gate control signal GCS and the data control signal DCS by using the timing synchronization signal TSS, an input unit or circuit 410 which receives the timing synchronization signal TSS and the pieces of input image data Ri, Gi, and Bi transmitted from the external system, transfers the pieces of input image data Ri, Gi, and Bi to the data aligner 430, and transfers the timing synchronization signal TSS to the control signal generator 420, and an output unit or circuit 440 which supplies the data driver 300 with pieces of image data Data generated by the data aligner 430 and the data control signal DCS generated by the control signal generator 420 and outputs the gate control signal GCS, generated by the control signal generator 420, to the gate driver 200.

The control signal generator 420 may generate a power control signal PCS supplied to the power supply 500.

The control driver 400 may include a storage unit or circuit or device 450 for storing various information. The storage unit 450 may be included in the control driver 400 or may be provided separately from the control driver 400 and provided independently.

The external system may perform a function of driving the control driver 400 and an electronic device. For example, when the electronic device is a television (TV), the external system may receive various kinds of sound information, image information, and letter information over a communication network and may transmit the received image information to the control driver 400. In this case, the image information may be the pieces of input image data Ri, Gi, and Bi.

The power supply 500 may generate various powers and supply the generated powers to the control driver 400, the gate driver 200, the data driver 300, and the light emitting display panel 100.

Particularly, the power supply 500 may include a cathode voltage generator 510 for supplying a cathode voltage to the cathodes of the light emitting devices ED.

The gate driver 200 may be directly embedded into the non-display area NDA by using a gate-in panel (GIP) type.

When The gate driver 200 is provided in the non-display area NDA by using the gate-in panel (GIP) type, transistors (hereinafter simply referred to as a non-display transistor) configuring the gate driver 200 may be provided through the same process as transistors included in the pixels P of the display area DA.

The gate driver 200 may supply gate pulses GP1 to GPg to the gate lines GL1 to GLg.

When a gate pulse generated by the gate driver 200 is supplied to a gate of a switching transistor Tsw1 included in the pixel P, the switching transistor Tsw1 may be turned on. When the switching transistor is turned on, data voltage Vdata supplied through the data line may be supplied to the pixel P.

When a gate-off signal generated by the gate driver 200 is supplied to the switching transistor Tsw1, the switching transistor Tsw1 may be turned off. When the switching transistor Tsw1 is turned off, a data voltage may not be supplied to the pixel P any longer.

The gate signal GS supplied to the gate line GL may include the gate pulse GP and the gate-off signal.

In order to supply the gate pulses GP1 to GPg to gate lines GL1 to GLg, the gate driver 200 may include stages ST1 to STg connected to the gate lines GL1 to GLg, as illustrated in FIG. 4.

Each of the stages ST1 to STg may be connected to one gate line GL, but may also be connected to at least two gate lines GL. Hereinafter, for convenience of description, as illustrated in FIG. 4, a gate driver 200 in which each of the stages ST1 to STg is connected to one gate line GL will be described as an example of the present disclosure.

At least one of the signals output from the stage ST in which the gate pulse GP is output may be supplied to another stage ST to drive another stage ST. Accordingly, a gate pulse may be output in another stage ST.

The gate control signals GCS may be supplied to the stages ST through the gate control signal line GCL.

The gate control signals GCS may be supplied to the stages ST through the gate control signal line GCL.

The gate control signal line GCL may be, for example, a line which supplies the gate clock needed at the stage ST, or a line which supplies the power needed at the stage ST. Accordingly, at least one gate control signal line GCL may be provided in the non-display area NDA.

In the following description, as illustrated in FIG. 4, a region equipped with a gate control signal line GCL in the non-display areas NDA may be referred to as a line non-display area NDA_L, and a region equipped with non-display transistors configuring the stages ST in the non-display areas NDA may be referred to as a transistor non-display area NDA_T.

A schematic structure of the stage ST performing the above-described function is illustrated in FIG. 5.

The stage ST may include a plurality of non-display transistors. In order to describe a schematic structure of the stage ST, in FIG. 5, a stage ST including four non-display transistors Tst, Trs, Tu, and Td is illustrated as an example of a stage ST applied to a light emitting display apparatus according to the present disclosure.

In this case, a high voltage line 11 to which a high voltage GVDD is supplied, a gate clock line 12 to which a gate clock GCLK is supplied, a first low voltage line 13 to which a first low voltage GVSS1 is supplied, and a second low voltage line to which a second low voltage GVSS2 is supplied may be included in gate control signal lines GCL.

A start transistor Tst may be turned on based on a start signal Vst and may supply a high voltage GVDD to a gate of the pull-up transistor Tu through a circuit unit or circuit and a Q node Q. Here, the start signal Vst may be transferred from the control driver 400, or may be a signal which is transferred from a previous stage. In this case, the previous stage may be a stage which is directly adjacent to a currently driven stage ST, or may be a stage which is separated from the currently driven stage with at least one stage therebetween.

The pull-up transistor Tu may be turned on by the high voltage GVDD to output the gate pulse GP to the gate line GL. In this case, a gate pulse GP having a high level may be output to the gate line GL.

In this case, the pull-down transistor Td may be turned off by the first low voltage GVSS1 supplied to the gate of the pull-down transistor Td through the circuit unit C and a Qb node Qb. Accordingly, only the gate pulse GP passing through the pull-up transistor Tu may be output to the gate line GL.

When the start transistor Tst is turned off and the reset transistor Trs is turned on by a reset signal Rest, the first low voltage GVSS1 may be supplied to the pull-up transistor Tu through the reset transistor Trs and the circuit unit C, and thus, the pull-up transistor Tu may be turned off.

In this case, the high voltage GVDD may be supplied to the gate of the pull-down transistor Td through the circuit unit C and the Qb node Qb, and thus, the pull-down transistor Td may be turned on. When the pull-down transistor Td is turned on, the second low voltage GVSS2 may be supplied to the gate line GL through the pull-down transistor Td. The second low voltage GVSS2 may be the same voltage as the first low voltage EVSS1, or may be a different voltage from the first low voltage EVSS1.

That is, because the pull-up transistor Tu is turned off when the pull-down transistor Td is turned on, the second low voltage GVSS2 with a low level passing through the pull-down transistor Td may be output to the gate line GL. The second low voltage GVSS2 supplied to the gate line GL through the pull-down transistor Td may be a gate-off signal. The switching transistor Tsw1 may be turned off by the gate-off signal supplied to the gate of the switching transistor Tsw1. Although it is described that a transistor is turned off by a low voltage and is turned on by a high voltage, embodiments are not limited thereto. As an example, a transistor may be turned off by a high voltage and is turned on by a low voltage, depending on the type of the transistor.

The structure and driving method of the stage ST may be variously changed based on the structure and driving method described with reference to FIG. 5.

For example, the structure of the circuit unit C illustrated in FIG. 5 maybe variously changed, and at least one non-display transistor may be provided in the circuit unit C.

That is, in addition to the four non-display transistors Tst, Trs, Tu, and Td illustrated in FIG. 5, other non-display transistors may be further provided in the stage ST.

Accordingly, a driving method of the stage ST may also be variously changed based on the structure and number of non-display transistors.

A non-display light emitting device NED may be connected to the non-display transistor provided in the stage ST applied to the present disclosure, and the non-display light emitting device NED may be provided to overlap the non-display transistor.

In this case, non-display light emitting devices NED may be provided in all non-display transistors provided in the stage ST.

For example, as illustrated in FIG. 5, each of the four non-display transistors Tst, Trs, Tu, and Td may be provided with a non-display light emitting device NED.

An anode (hereinafter, simply referred to as a non-display anode) of the non-display light emitting device NED may be connected to any one of the non-display transistors, a cathode (hereinafter, simply referred to as a non-display cathode) of the non-display light emitting device NED may be electrically connected to the power supply 500, and a light emitting layer may be provided between the non-display anode and the non-display cathode. The second voltage EVSS may be supplied to the non-display cathode.

For example, the second voltage EVSS may be commonly supplied to the cathode of the light emitting device illustrated in FIG. 2 and the non-display cathode of the non-display light emitting device NED illustrated in FIG. 5. The second voltage EVSS is also referred to as a cathode voltage in the following description.

In this case, one non-display light emitting device NED may be commonly connected to two non-display transistors adjacent and connected to each other, and the commonly connected non-display light emitting device NED may be provided to overlap both the non-display transistors.

For example, the non-display anode of the non-display light emitting device NED connected to the start transistor Tst among the non-display transistors illustrated in FIG. 5 and the non-display anode of the non-display light emitting device NED connected to the reset transistor Trs among the non-display transistors illustrated in FIG. 5 maybe commonly connected to a node between the start transistor Tst and reset transistor Trs. Accordingly, the two non-display light emitting devices NED may be substantially one non-display light emitting device NED. In this case, one non-display light emitting device NED connected to the node between the start transistor Tst and the reset transistor Trs may be provided to overlap both the start transistor Tst and the reset transistor Trs.

Moreover, the non-display anode of the non-display light emitting device NED connected to the pull-up transistor Tu illustrated in FIG. 5 and the non-display anode of the non-display light emitting device NED connected to the pull-down transistor Td may be commonly connected to the node between the pull-up transistor Tu and the pull-down transistor Td. Accordingly, the two non-display light emitting devices NED may be substantially one non-display light emitting device NED. In this case, one non-display light emitting device NED connected to the node between the pull-up transistor Tu and the pull-down transistor Td may be provided to overlap both the pull-up transistor Tu and the pull-down transistor Td. Moreover, because the node between the pull-up transistor Tu and the pull-down transistor Td is connected to a gate line GL, the gate signal GS may be supplied to the gate line GL through the node between the pull-up transistor Tu and pull-down transistor Td.

In addition to the four non-display transistors Tst, Trs, Tu, and Td), all non-display transistors provided in the stage ST may be provided with a non-display light emitting device NED, and each of the non-display light emitting devices NED may be provided to overlap at least one non-display transistor.

Figure 6:
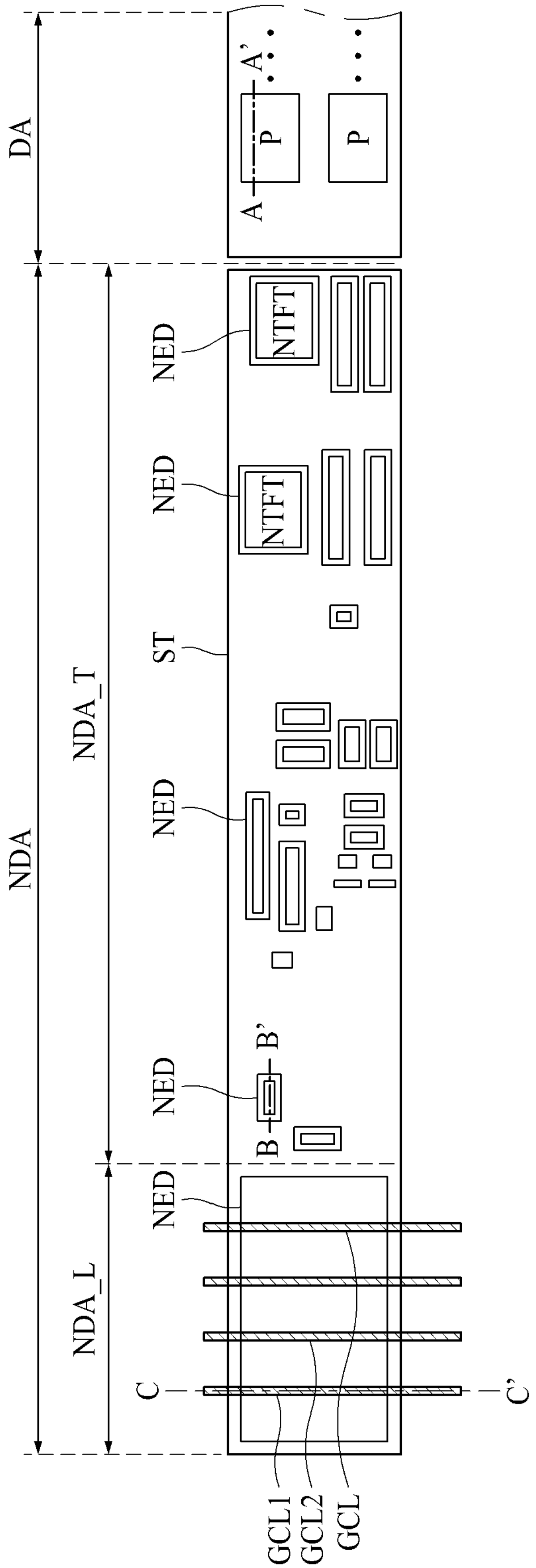
FIG. 6 is an example diagram illustrating a stage applied to a light emitting display apparatus according to the present disclosure and pixels adjacent to the stage.
Figure 7:
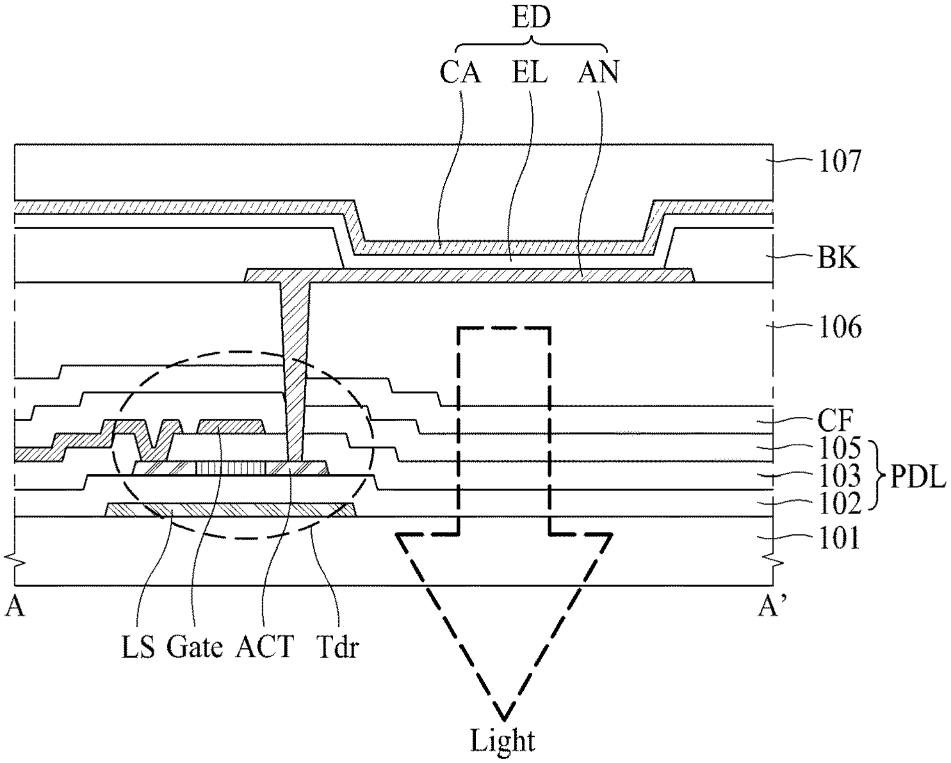
FIG. 7 is an example diagram illustrating a cross-sectional surface taken along line A-A' illustrated in FIG. 6.
Figure 8:
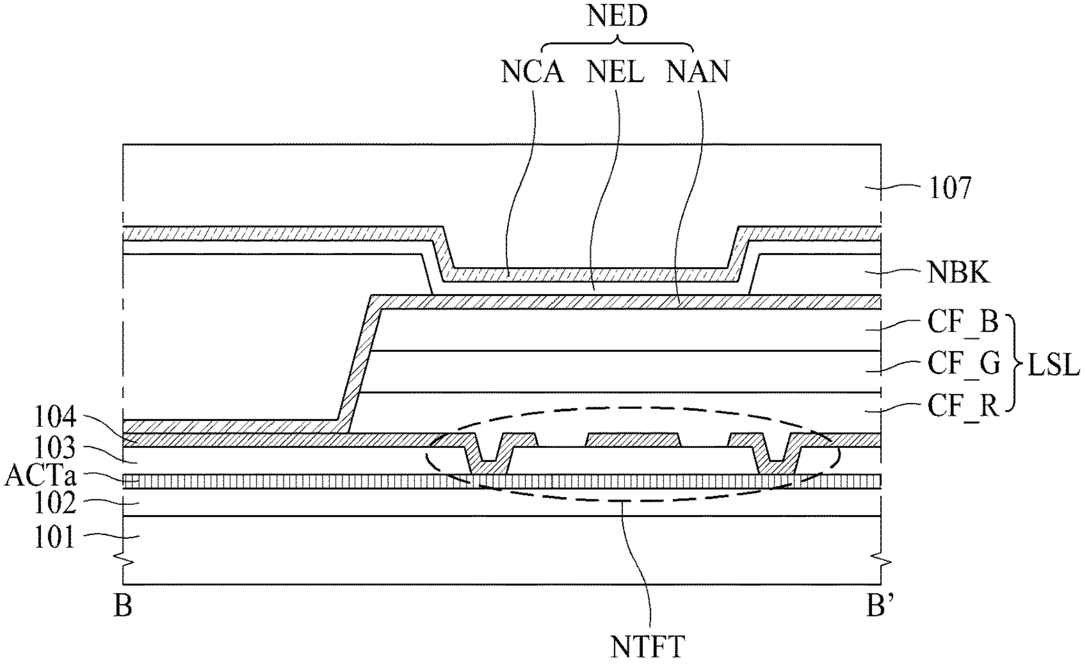
FIG. 8 is an example diagram illustrating a cross-sectional surface taken along line B-B' illustrated in FIG. 6.
Figure 9:
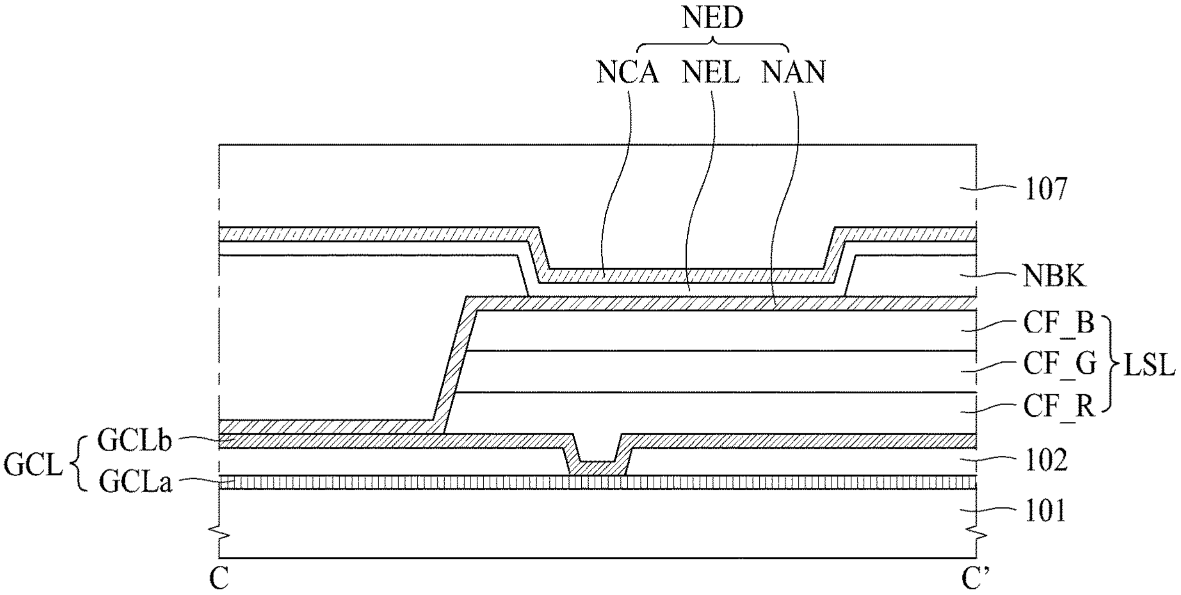
FIG. 9 is an example diagram illustrating a cross-sectional surface taken along line C-C' illustrated in FIG. 6.

FIG. 6 is an example diagram illustrating a stage applied to a light emitting display apparatus according to the present disclosure and pixels adjacent to the stage, FIG. 7 is an example diagram illustrating a cross-sectional surface taken along line A-A' illustrated in FIG. 6, FIG. 8 is an example diagram illustrating a cross-sectional surface taken along line B-B' illustrated in FIG. 6, and FIG. 9 is an example diagram illustrating a cross-sectional surface taken along line C-C' illustrated in FIG. 6. In the following description, details which are the same as or similar to details described above with reference to FIGS. 1 to 5 are omitted or will be simply described.

The light emitting display apparatus according to the present disclosure may include a light emitting display panel 100 divided into a display area DA provided with pixels P including light emitting devices ED and a non-display area NDA outside the display area DA, a power supply unit 500 supplying a power to the light emitting display panel 100, a data driver 300, a gate driver 200, and a control driver 400.

Particularly, a gate driver 200 which supplies gate pulses GP to the gate lines GL provided in the light emitting display panel 100 may be included in the non-display area NDA.

The gate driver 200 may include stages STs connected to the gate lines GL, each of the stages ST may be provided with non-display transistors NTFT, a non-display light emitting device NED may be connected to the non-display transistor NTFT.

In the following description, the non-display area NDA provided with the gate driver 200 may be divided into a line non-display area NDA_L and a transistor non-display area NDA_T.

As illustrated in FIG. 6, the non-display transistors NTFT included in the stage ST may be provided in the transistor non-display area NDA_T and the gate control signal line GCL may be provided in the line non-display area NDA_L.

The non-display transistors NTFT and the gate control signal lines GCL may be provided to overlap the non-display light emitting devices NED.

The non-display transistors NTFT provided in the transistor non-display area NDA_T may include, for example, a start transistor Tst, a reset transistor Trs, a pull-up transistor Tu, and a pull-down transistor Td, which are illustrated in FIG. 5.

As illustrated in FIG. 6, each of the non-display light emitting devices NED may overlap the non-display transistor NTFT. That is, FIG. 6 schematically illustrates positions of the non-display transistors NTFT provided in the stage ST, and schematically illustrates positions of the non-display light emitting devices NED overlapping the non-display transistors NTFT.

In this case, as described above, one non-display light emitting device NED may overlap at least one non-display transistor NTFT.

Moreover, among the non-display transistors NTFT provided in the stage ST, there may be a non-display transistor NTFT which does not overlap a non-display light emitting device NED. However, in order to determine whether all non-display transistors NTFT provided in the stage ST are normally operating, all of the non-display transistors NTFT provided in the stage ST may overlap the non-display light emitting device NED.

The gate control signal lines GCL provided in the line non-display area NDA_L may be lines which supply the gate clocks needed in the stage ST or lines which supply the power needed in the stage ST, as described above with reference to FIG. 4.

A non-display light emitting device NED overlapping the gate control signal lines GCL may be provided in each of the stages ST, as illustrated in FIG. 6.

In this case, the non-display light emitting device NED overlapping the gate control signal lines GCL may be connected to any one of the gate control signal lines GCL.

For example, a kth non-display light emitting device overlapping the gate control signal lines GCL in a kth stage among the stages ST may be connected to a first gate control signal line GCL1 among the gate control signal lines GCL, and a k+1th non-display light emitting device overlapping the gate control signal lines GCL in a k+1th stage among the stages ST may be connected to a second gate control signal line GCL2 among the gate control signal lines GCL. K is a natural number less than g.

To provide an additional description, when the stage ST illustrated in FIG. 6 is the kth stage, the kth stage may be connected to the first gate control signal line GCL1 among the gate control signal lines GCL illustrated in FIG. 6, and the k+1th stage provided at an upper end or a lower end of the stage illustrated in FIG. 6 maybe connected to the second gate signal line GCL among the gate control signal lines GCL illustrated in FIG. 6.

The number of the stages ST may be greater than the number of the gate control signal lines GCL. Therefore, at least two non-display light emitting devices NED may be connected to one gate control signal line GCL, and at least two non-display light emitting devices NED may be provided in different stages ST. In this case, at least two non-display light emitting devices NED connected to one gate control signal line GCL may be provided to be apart from each other.

However, one non-display light emitting device NED connected to one gate control signal line GCL and overlapping all gate control signal lines GCL may be formed continuously in a plurality of stages ST.

For example, when the number of the gate control signal lines GCL is ten, ten non-display light emitting devices NED may be provided in the line non-display area NDA_L. In this case, the ten non-display light emitting devices NED may be arranged in a row along the line non-display area NDA_L, and each of the ten non-display light emitting devices NED may be provided continuously in at least two stages ST.

Moreover, each of the gate control signal lines may overlap a non-display light emitting device.

For example, when the number of gate control signal lines GCL is ten, ten non-display light emitting devices NED may be provided in the line non-display area NDA_L. In this case, each of the ten non-display light emitting devices NED may be provided to overlap one gate control signal line GCL.

Therefore, the ten non-display light emitting devices NED may be arranged in parallel with each other, and each of the ten gate non-display light emitting devices NED may be provided to overlap one gate control signal line GCL.

Therefore, ten gate control signal lines GCL may be arranged in parallel with each other in the line non-display area NDA_L of one stage ST, and each of the ten gate control signal lines GCL may be provided to overlap one gate control signal line GCL.

In this case, one non-display light emitting device NED may be provided continuously in all stages ST, but may be divided into at least two portions. However, the at least two portions may be commonly connected to one gate control signal line GCL.

The pixels P may be provided in the display area DA. The stage ST may be connected to at least one gate line GL, and pixels P may be connected to the gate line GL.

Hereinafter, cross-sectional surfaces of the line non-display area NDA_L, the transistor non-display area NDA_T, and the display area DA illustrated in FIG. 6 will be described with reference to FIGS. 6 to 9.

First, FIG. 7 is an example diagram illustrating a cross-sectional surface taken along line A-A' illustrated in FIG. 6. That is, a cross sectional surface illustrated in FIG. 7 is an example diagram illustrating a cross sectional surface of a pixel P provided in the display area DA.

As illustrated in FIG. 7, the light emitting display panel 100 applied to the present disclosure may include a substrate 101, a pixel driving circuit layer PDL provided at an upper end of the substrate 101, a planarization layer (also referred to as an overcoating layer OC) 106 provided on at upper end of the pixel driving circuit layer PDL to cover the pixel driving circuit layer PDL, an anode AN provided at an upper end of the planarization layer 106, a light emitting layer EL provided at an upper end of the anode AN, a cathode CA provided at an upper end of the light emitting layer EL, and an encapsulation layer 107 covering the cathode CA. An outer portion of the anode AN may be surrounded by a bank BK.

The substrate 101 may be a glass substrate or a plastic substrate, and moreover, may be formed of various kinds of films. Embodiments are not limited thereto. As an example, the substrate 101 may be also a substrate of another material, such as metal or semiconductors. As an example, the substrate may be single layer or multi-layers structure in which organic material layer and inorganic material layer are stacked alternatively. As an example, the plastic may be polyimide (PI), polyethylene terephthalate (PET), polyethylene naphthalate (PEN), polycarbonate (PC), etc.

The pixel driving circuit layer PDL including a driving transistor Tdr may be provided on the substrate 101. A pixel driving circuit PDC including the driving transistor Tdr may be provided in the pixel driving circuit layer PDL. The pixel driving circuit PDC, as described above with reference to FIG. 2, may include a switching transistor Tsw1, a storage capacitor Cst, a driving transistor Tdr, and a sensing transistor Tsw2. That is, the pixel driving circuit layer PDL may include at least two transistors.

Each of the transistors may include an active layer ACT including a semiconductor, a gate insulation layer 103 which is provided on the active layer ACT, and a gate Gate which is provided on the gate insulation layer 103. The gate Gate may be covered by a passivation layer 105, and the passivation layer 105 may be covered by the planarization layer 106.

For example, the driving transistor Tdr illustrated in FIG. 7 may include an active layer ACT which is provided on a buffer 102, a gate insulation layer 103 which is provided on the active layer ACT, a gate Gate which is provided on the gate insulation layer 103, and a passivation layer 105 which covers an upper end of the gate Gate. In this case, the other transistors may be configured as a type similar to the driving transistor Tdr illustrated in FIG. 7.

However, a structure of each of the driving transistor Tdr and the other transistors is not limited to a structure of the driving transistor Tdr illustrated in FIG. 7. That is, a structure of each of the driving transistor Tdr and the other transistors may be changed to various types.

In this case, as illustrated in FIG. 7, a light blocking plate LS may be provided under the driving transistor Tdr, so as to block external light penetrating into the active layer ACT in performing a manufacturing process of a light emitting display apparatus or in using the light emitting display apparatus. Also, the light blocking plate LS may be connected to one of a gate, a first gate electrode, and a second gate electrode of the driving transistor Tdr. Also, the light blocking plate LS may be used as various lines, for example, as a data line. Accordingly, the light blocking plate LS may be provided in a floating state and may also be connected to a signal line through which a voltage is supplied.

The light blocking plate LS may be provided under the other transistors included in the pixel driving circuit layer PDL, or may not be provided under the other transistors included in the pixel driving circuit layer PDL. That is, the light blocking plate LS may be provided at a lower end of the other transistor requiring blocking of light, in addition to a lower end of the driving transistor Tdr, or may be provided in a region requiring blocking of light among regions where a transistor is not provided. As an example, the light blocking plate LS may be omitted.

The light blocking plate LS may be provided on the substrate 101 and may be covered by the buffer 102, and the active layer ACT may be provided on the buffer 102.

Moreover, the pixel driving circuit layer PDL may include a data line DL, a gate line GL, a sensing control line SCL, a sensing line SL, and a voltage supply line PLA, which are connected to the pixel driving circuit PDC.

Each of the buffer 102, the gate insulation layer 103, and the passivation layer 105 may be formed of at least one inorganic layer or at least one organic layer, or may be formed of at least one inorganic layer and at least one organic layer. The buffer 102, the gate insulation layer 103, and the passivation layer 105 may be referred to as an insulation layer.

The gate Gate of the driving transistor Tdr and the light blocking plate LS may be formed of metal.

A color filter CF may be provided at an upper end of the passivation layer 105. For example, when a light generated in the light emitting device ED illustrated in FIG. 7 is output in a direction toward the substrate 101, as illustrated in FIG. 7, the color filter CF may be provided at an upper end of the passivation layer 105. However, the position of the color filter CF may be variously changed. For example, the color filter CF may be provided inside the planarization layer 106 or may be provided at an upper end of the planarization layer 106. A type where light is output in a direction toward the substrate 101 as illustrated in FIG. 7 maybe referred to as a bottom emission type. As an example, the color filter CF may be omitted.

The color filter CF may be provided for each pixel P, and the color of the color filter CF may be variously changed. For example, when a unit pixel includes a red pixel, a green pixel, a blue pixel, and a white pixel, one of a red color filter, a green color filter, and a blue color filter may be provided in a pixel, and a white pixel may not be provided with a color filter. That is, color filters CF of various colors may be provided in the light emitting display panel 100.

The planarization layer 106 may be provided on the pixel driving circuit layer PDL and the color filter CF.

The planarization layer 106 may perform a function of planarizing an upper surface of the pixel driving circuit layer PDL which is not flat. That is, the planarization layer 106 may be formed to have a thickness which is greater than that of the pixel driving circuit layer PDL, and thus, the upper surface of the planarization layer 106 may be a flat surface. The planarization layer 106 may be formed of at least one inorganic layer or at least one organic layer, or may be formed of at least one inorganic layer and at least one organic layer.

The anode AN may be provided on the planarization layer 106. The anode AN may configure the light emitting device ED. The anode AN, as illustrated in FIG. 7, may be electrically connected to the driving transistor Tdr included in the pixel driving circuit layer PDL and may be patterned for each pixel 110.

In a light emitting display panel 100 using the bottom emission type, the anode AN may be formed of a transparent electrode such as indium tin oxide (ITO) or indium zinc oxide (IZO), without being limited thereto. As an example, in a light emitting display panel 100 using the top emission type, the anode AN may be formed of a transparent electrode or an opaque material.

That is, light emitted from the light emitting layer EL should pass through the anode AN. Accordingly, the anode AN may be formed as a transparent electrode.

A bank BK may be provided on the planarization layer 106, and an opening portion through which the anode AN is exposed may be formed by the bank BK.

That is, the bank BK may cover outer portions of the anode electrode AE, and thus, the opening portion through which light is output in one pixel 110 may be formed. That is, a region, uncovered by the bank BK, of the anode AN illustrated in FIG. 7 maybe the opening portion.

To provide an additional description, the bank BN may cover outer portions of the anode AN and may be provided in the display area DA of the substrate 101 so that the anode AN is exposed.

The bank BN may prevent a phenomenon where lights overlap between adjacent pixels.

The bank BN may be formed of at least one inorganic layer or at least one organic layer, or may be formed of at least one inorganic layer and at least one organic layer.

The light emitting layer EL may be provided on a whole surface of the substrate 101 to cover the anode AN and the bank BN.

The light emitting layer EL may include one of an organic light emitting layer, an inorganic light emitting layer, and a quantum dot light emitting layer, or may include a stack or combination structure of an organic light emitting layer (or an inorganic light emitting layer) and a quantum dot light emitting layer.

The light emitting layer EL may include a hole injection layer (HIL), a hole transport layer (HTL), a hole blocking layer (HBL), an electron injection layer (EIL), an electron transport layer (ETL), an electron blocking layer (EBL), and a charge generating layer (CGL).

In a case where the light emitting layer EL emits white light, the light emitting layer EL may include hole injection layer (HIL)/hole transport layer (HTL), a blue organic layer, electron injection layer (EIL)/charge generating layer (CGL)/electron transport layer (ETL), a red organic layer, a yellow-green organic layer, electron injection layer (EIL)/charge generating layer (CGL)/electron transport layer (ETL), a blue organic layer, electron injection layer (EIL)/electron transport layer (ETL), and an organic buffer, which are sequentially stacked on the anode AN.

The light emitting layer EL may include layers having various stack orders, in addition to layers having a stack order described above.

The cathode CA may be provided on the light emitting layer EL, and particularly, may be provided in a plate shape in the display area DA.

The light emitting display panel 110 applied to the present disclosure may use the bottom emission type as described above. In this case, the cathode CA may perform a function of reflecting light, emitted from the light emitting layer EL, toward the anode AN. To this end, the cathode CA may include metal such as copper or aluminum.

The cathode CA may be covered by the encapsulation layer 107. The encapsulation layer 107 may be formed of at least one organic layer or at least one inorganic layer, or may be formed of at least one inorganic layer and at least one organic layer. Water and oxygen flowing in from the outside may be blocked by the encapsulation layer 107, and thus, may not penetrate into the light emitting layer EL.

Next, FIG. 8 is an example diagram illustrating a cross-sectional surface taken along line B-B' illustrated in FIG. 6. That is, the cross-sectional surface illustrated in FIG. 8 is an example diagram illustrating the cross-sectional surface of the non-display transistor NTFT and the non-display light emitting device NED which are provided in the transistor non-display area NDA_T.

The transistor non-display area NDA_T may be adjacent to the display area DA, as illustrated in FIG. 6, and may share various layers configuring the display area DA.

For example, the transistor non-display area NDA_T, as illustrated in FIG. 8, may include a substrate 101, a buffer 102 provided on the substrate 101, a non-display active layer ACTa provided on the buffer 102, a gate insulation layer 103 provided on the non-display active layer ACTa, gate layers 104 provided on the gate insulation layer 103, a light blocking layer LSL provided on the gate layers 104, a non-display anode NAN provided on the light blocking layer LSL and connected to any one of the gate layers 104, a non-display bank NBK covering the outer portion of the non-display anode NAN, a non-display light emitting layer NEL provided on the non-display bank NBK, a non-display cathode NCA provided on the non-display light emitting layer NEL, and an encapsulation layer 107 covering the non-display cathode NCA.

Here, the substrate 101, the buffer 102, the insulation layer 103, and the encapsulation layer 107 may correspond to the substrate 101, the buffer 102, the insulation layer 103, and the encapsulation layer 107 described above with reference to FIG. 7. That is, the buffer 102, the insulation layer 103, and the encapsulation layer 107 may be provided on the whole substrate 101. Furthermore, the passivation layer 105 and the planarization layer 106 may be further provided at an upper end of the gate layers 104 illustrated in FIG. 8, and in this case, the non-display anode NAN may be connected to any one of the gate layers 104 through contact holes provided in the passivation layer 105 and the planarization layer 106.

That is, the non-display active layer ACTa, the gate insulation layer 103, and the gate layers 104 illustrated in FIG. 8 may configure the non-display transistor NTFT.

Moreover, the non-display anode NAN, the non-display light emitting layer NEL, and the non-display cathode NCA may configure the non-display light emitting device NED.

In this case, one of the gate layers 104 may be a gate of the non-display transistor NTFT, another may be a first terminal of the non-display transistor NTFT, and another may be a second terminal of the non-display transistor NTFT.

That is, as illustrated in FIG. 8, the non-display transistor NTFT may be connected to the non-display light emitting device NED. Particularly, the non-display transistor NTFT may be connected to the non-display anode NAN of the non-display light emitting device NED, and the non-display light emitting device NED may be provided to overlap the non-display transistor NTFT. That is, the non-display light emitting device NED may be provided at an upper end or a lower end of the non-display transistor NTFT in the cross-sectional surface of the light emitting display panel 100, and FIG. 8 illustrates a light emitting display panel 100 provided with a non-display light emitting device NED at an upper end of the non-display transistor NTFT.

In this case, a first terminal or a second terminal of the non-display transistor NTFT may be connected to the non-display anode NAN.

Therefore, the non-display light emitting device NED may output light by using the current and voltage supplied to the first or second terminal of the non-display transistor NTFT.

When light is output from the non-display light emitting device NED, the temperature of the non-display transistor NTFT connected to the non-display light emitting device NED can increase rapidly. Accordingly, it may be quickly determined whether the non-display transistor NTFT is normally driven at a high temperature.

Therefore, according to the present disclosure, it may be quickly determined whether the gate driver 200 is normally driven at a high temperature.

In this case, if the non-display transistor NTFT is not normally driven, current and voltage may not be normally supplied to the first or second terminal, and thus light may not be output from the non-display light emitting device NED.

The non-display light emitting device NED in which light is not output may be identified through various cameras or magnifiers.

It may be determined that the non-display transistor NTFT connected to the non-display light emitting device NED, which does not output light, does not operate normally.

That is, according to the present disclosure, among the numerous non-display transistors NTFT configuring the gate driver 200, a non-display transistor NTFT which does not operate normally can be quickly and simply identified. Accordingly, whether the gate driver 200 is defective and a specific position of the defect may be quickly and accurately determined.

A light blocking layer LSL which blocks light may be provided at an upper end or a lower end of the non-display light emitting device NED. When the light emitting display panel 100 illustrated in FIGS. 6 to 9 uses a bottom emission type, the light blocking layer LSL may be provided at a lower end of the non-display light emitting device NED, as illustrated in FIG. 8.

That is, the non-display light emitting device NED is not provided to output light to the outside of the light emitting display panel 100, but to increase the temperature of the gate driver 200. Therefore, a light blocking layer LSL which blocks light may be provided between the non-display light emitting device NED and the substrate 101 so that light generated from the non-display light emitting device NED is not output to the outside through the substrate 101.

The light blocking layer LSL may be formed of various materials capable of blocking light, and may be formed by stacking at least two color filters CF. For example, the light blocking layer LSL may consist of a red color filter CF_R, a green color filter CF_G, and a blue color filter CF_B, as illustrated in FIG. 8.

The red color filter CF_R, the green color filter CF_G, and the blue color filter CF_B may be provided in the pixels P to determine the color of the pixels P, as described above with reference to FIG. 7. That is, the light blocking layer LSL may be formed by stacking at least two color filters CFs when color filters CF are provided in the display area DA.

In this case, a planarization layer 106 may be further provided at an upper end of the light blocking layer LSL, and a non-display light emitting device NED may be provided on the planarization layer 106.

Finally, FIG. 9 is an example diagram illustrating a cross-sectional surface taken along line C-C' illustrated in FIG. 6. That is, the cross-sectional surface illustrated in FIG. 9 is an example diagram illustrating a cross-sectional surface of the gate control signal line GCL and the non-display light emitting device NED provided in the line non-display area NDA_L.

The line non-display area NDA_L may be adjacent to the transistor non-display area NDA_T as illustrated in FIG. 6, and may share various layers configuring the display area DA and the transistor non-display area NDA_T.

For example, the line non-display area NDA_L, as illustrated in FIG. 9, may include a substrate 101, a main gate control signal line GCLa provided on the substrate 101, a buffer 102 provided on the main gate control signal line GCLa, an auxiliary gate control signal line GCLb provided on the buffer 102, a light blocking layer LSL provided on the auxiliary gate control signal line GCLb, a non-display anode NAN provided on the light blocking layer LSL and connected to the auxiliary gate control signal line GCLb, a non-display bank NBK covering the outer portion of the non-display anode NAN, a non-display light emitting layer NEL provided on the non-display bank NBK, a non-display cathode NCA provided on the non-display light emitting layer NEL, and an encapsulation layer 107 covering the non-display cathode NCA.

Here, the substrate 101, the buffer 102, and the encapsulation layer 107 may correspond to the substrate 101, the buffer 102, and the encapsulation layer 107 described above with reference to FIG. 7. That is, the buffer 102 and the encapsulation layer 107 may be provided on the whole substrate 101. Furthermore, the passivation layer 105 and the planarization layer 106 may be further provided at an upper end of the auxiliary gate control signal line GCLb illustrated in FIG. 9, and in this case, the non-display anode NAN may be connected to the auxiliary gate control signal line GCLb through contact holes provided in the passivation layer 105 and the planarization layer 106. Furthermore, a gate insulation layer 103 may be further provided between the main gate control signal line GCLa and the auxiliary gate control signal line GCLb, and in this case, the main gate control signal line GCLa and the auxiliary gate control signal line GCLb may be connected through contact holes provided in the buffer 102 and the gate insulation layer 103.

In this case, the main gate control signal line GCLa and the auxiliary gate control signal line GCLb illustrated in FIG. 9 may configure the gate control signal line GCL. The main gate control signal line GCLa may be formed with the light blocking plate LS, and the auxiliary gate control signal line GCLb may be formed with the gate Gate.

Moreover, the non-display anode NAN, the non-display light emitting layer NEL, and the non-display cathode NCA may configure a non-display light emitting device NED.

In this case, the auxiliary gate control signal line GCLb may be connected to the non-display light emitting device NED. That is, the gate control signal line GCL may be connected to the non-display light emitting device NED. Although FIG. 9 illustrates the gate control signal line GCL including the auxiliary gate control signal line GCLb and the main gate control signal line GCLa, the gate control signal line GCL may include only one of the auxiliary gate control signal line GCLb and the main gate control signal line GCLa.

Particularly, the non-display transistor NTFT may be provided to overlap the gate control signal line GCL. That is, the non-display light emitting device NED may be provided at an upper end or a lower end of the gate control signal line GCL in the cross-sectional surface of the light emitting display panel 100, and FIG. 9 illustrates a light emitting display panel 100 provided with a non-display light emitting device NED at an upper end of the gate control signal line GCL.

Therefore, the non-display light emitting device NED may output light by using current, voltage, and a clock supplied to the gate control signal line GCL.

When light is output from the non-display light emitting device NED, the temperature of the gate control signal line connected to the non-display light emitting device NED or overlapping the non-display light emitting device NED can increase rapidly. Accordingly, it may be quickly determined whether the gate control signal line GCL is normally driven at a high temperature.

Therefore, according to the present disclosure, it may be quickly determined whether the gate driver 200 is normally driven at a high temperature.

In this case, if the gate control signal line GCL is not normally driven, current, voltage, and a clock may not be normally supplied to the gate control signal line connected to the non-display light emitting device NED or overlapping the non-display emitting device NED, and thus light may not be output from the non-display light emitting device NED.

The non-display light emitting device NED in which light is not output may be identified through various cameras or magnifiers.

It may be determined that the gate control signal line connected to the non-display light emitting device NED which does not output light or overlapping the non-display light emitting device NED which does not output light does not operate normally.

That is, according to the present disclosure, among the gate control signal lines GCL included in the gate driver 200, a gate control signal line GCL which does not operate normally can be quickly and simply identified. Accordingly, whether the gate driver 200 is defective and a defective gate control signal line GCL may be quickly and accurately determined.

A light blocking layer LSL which blocks light may be provided at an upper end or a lower end of the non-display light emitting device NED. The light blocking layer LSL provided on the gate control signal line GCL may have the same structure and perform the same function as the light blocking layer LSL described above with reference to FIG. 8. Accordingly, a detailed description of the light blocking layer LSL illustrated in FIG. 9 is omitted.

Figure 10:
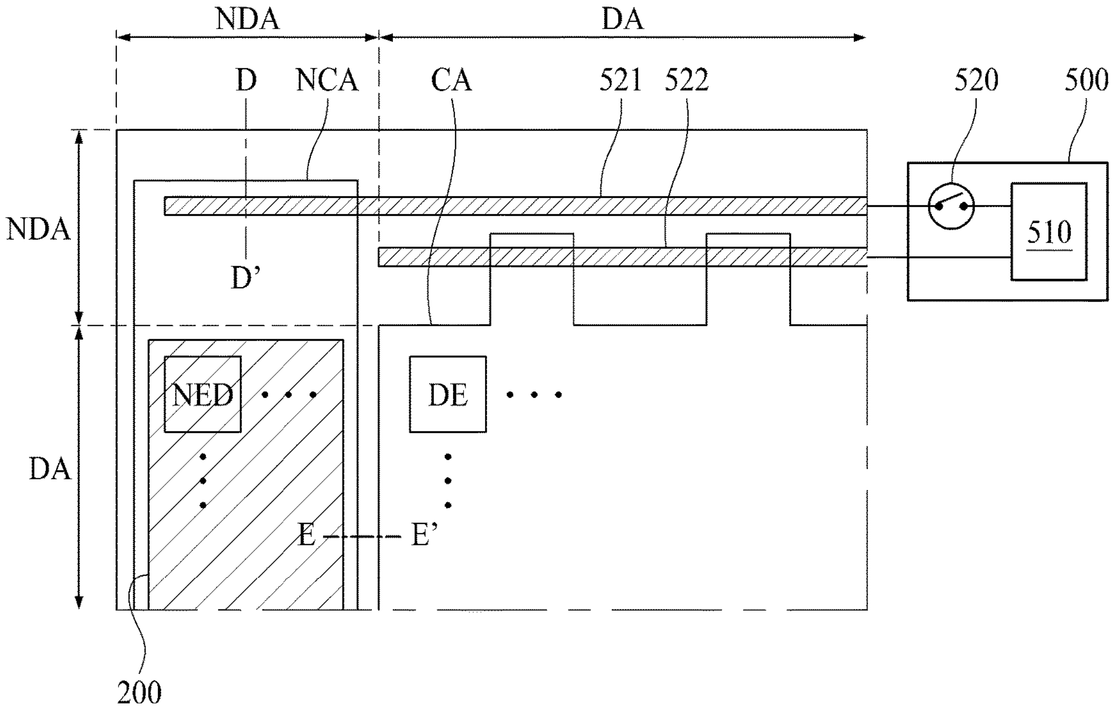
FIG. 10 is an example diagram illustrating a region in which cathode voltage lines are provided in a light emitting display panel according to the present disclosure.
Figure 11:
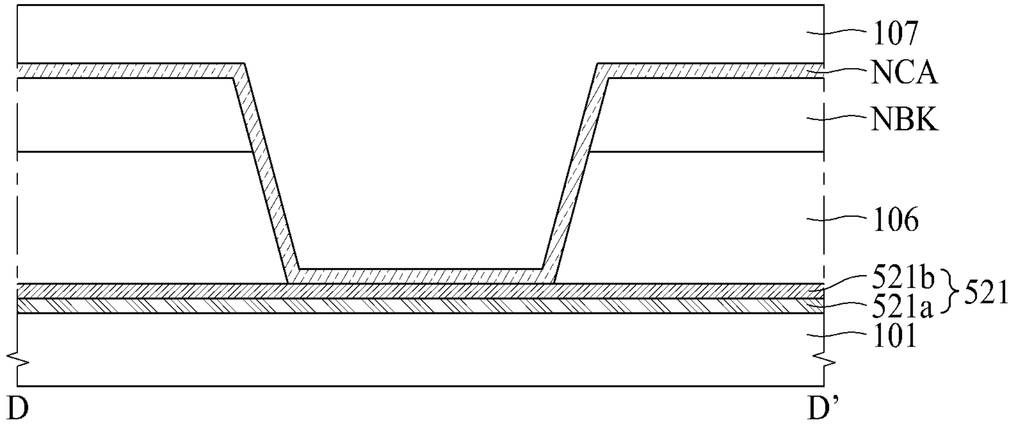
FIG. 11 is an example diagram illustrating a cross-sectional surface taken along line D-D' illustrated in FIG. 10.
Figure 12:
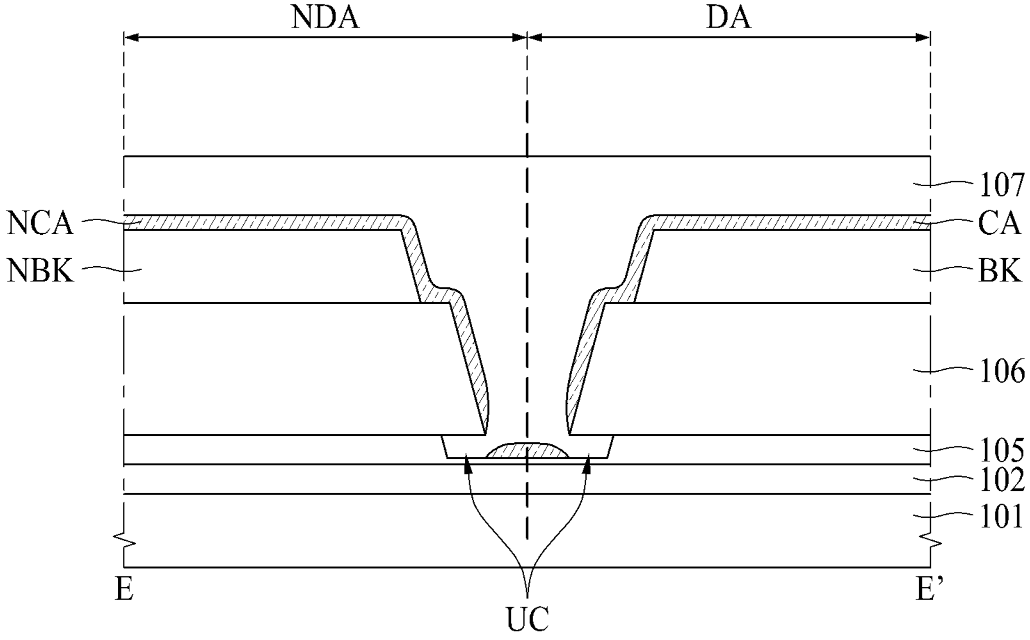
FIG. 12 is an example diagram illustrating a cross-sectional surface taken along line E-E' illustrated in FIG. 10.
Figure 13:
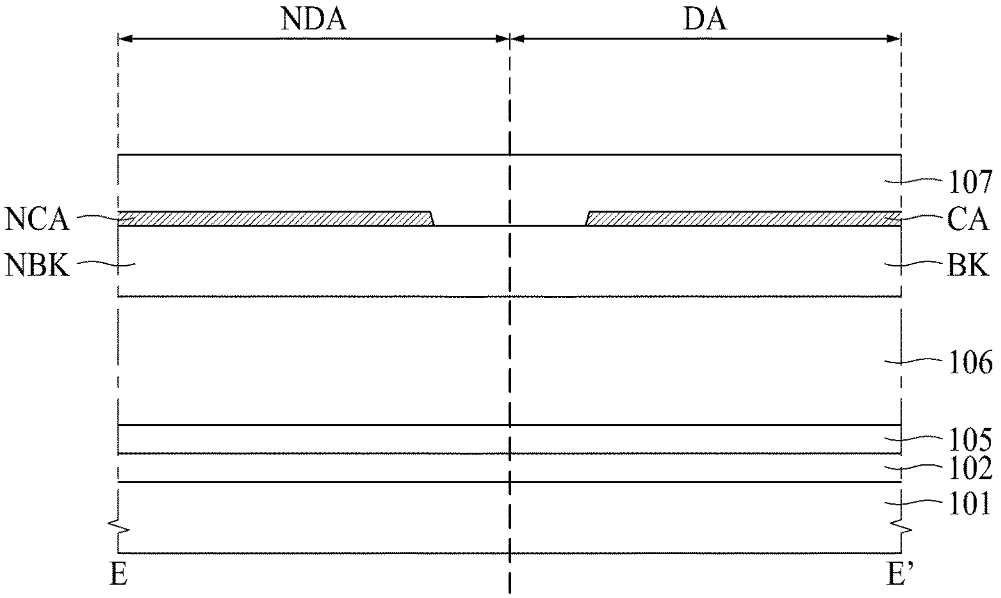
FIG. 13 is another example diagram illustrating a cross-sectional surface taken along line D-D' illustrated in FIG. 10.

FIG. 10 is an example diagram illustrating a region in which cathode voltage lines are provided in a light emitting display panel according to the present disclosure, FIG. 11 is an example diagram illustrating a cross-sectional surface taken along line D-D' illustrated in FIG. 10, FIG. 12 is an example diagram illustrating a cross-sectional surface taken along line E-E' illustrated in FIG. 10, and FIG. 13 is another example diagram illustrating a cross-sectional surface taken along line D-D' illustrated in FIG. 10. That is, FIG. 10 is an example diagram illustrating a portion of a light emitting display panel, and particularly, a region provided with a first cathode voltage line 521, a second cathode voltage line 522, a non-display cathode NCA, and a cathode CA. FIG. 10 illustrates a power supply 500 connected to the first cathode voltage line 521 and the second cathode voltage line 522 for convenience of description. In the following descriptions, details which are the same as or similar to the details described above with reference to FIGS. 1 to 9 are omitted or will be briefly described.

First, the power supply 500 may include a cathode voltage generator 510 for supplying a cathode voltage to the cathode CA of the light emitting devices ED, as illustrated in FIGS. 1 and 10. The second voltage EVSS illustrated in FIG. 2 maybe a cathode voltage.

The light emitting devices ED may be commonly connected to the cathode CA provided in the display area DA, and the non-display light emitting devices NED may be commonly connected to the non-display cathode NCA provided in the non-display area NDA.

The non-display cathode NCA of the non-display light emitting device NED may be connected to the first cathode voltage line 521 extending from the cathode voltage generator 510, and the cathode CA of the light emitting devices DE may be connected to the second cathode voltage line 522 extending from the cathode voltage generator 510.

That is, the same cathode voltage may be supplied to the non-display cathode NCA of the non-display light emitting device NED and the cathode CA of the light emitting device DE. However, the light emitting display apparatus according to the present disclosure is not limited thereto. Accordingly, cathode voltages supplied to the non-display cathode NCA and the cathode CA may be different from each other. In this case, the cathode voltage generator 510 may further include a first generator for generating a non-display cathode voltage supplied to the non-display cathode NCA and a second generator for generating a cathode voltage supplied to the cathode CA.

Hereinafter, for convenience of description, the light emitting display apparatus in which a cathode voltage supplied to the non-display cathode NCA is the same as a cathode voltage supplied to the cathode CA will be described as an example of the present disclosure, and in this case, the cathode voltage is generated in the cathode voltage generator 510.

In the light emitting display apparatus according to the present disclosure, the non-display light emitting device NED may be used to determine whether the gate driver 200 is normally driven in the process of manufacturing the light emitting display apparatus.

That is, the non-display light emitting device NED outputs light for testing in the manufacturing process of the light emitting display apparatus, and when the light emitting display apparatus is used by the user after the light emitting display apparatus is manufactured, the non-display light emitting device NED does not output light.

To this end, as an example, the first cathode voltage line 521 may be connected to or separated from the cathode voltage generator 510 by a cathode voltage switch 520 connected to the first cathode voltage line 521, as illustrated in FIG. 10. Although it is illustrated that the cathode voltage switch 520 is included in the power supply 500, the embodiments are not limited thereto. As an example, the cathode voltage switch 520 may be disposed on the display panel.

For example, in the manufacturing process of the light emitting display apparatus, the control driver 400 may transmit a power control signal PCS which can turn on the cathode voltage switch 520 to the cathode voltage switch 520. Accordingly, the cathode voltage can be transmitted to the non-display cathode NCA through the cathode voltage switch 520 and the first cathode voltage line 521, and thus light can be output from the non-display light emitting devices NED.

However, when the light emitting display apparatus is used by the user after the manufacture of the light emitting display apparatus is completed, the control driver 400 may transmit a power control signal PCS which can turn off the cathode voltage switch 520 to the cathode voltage switch 520. Accordingly, the cathode voltage may not be transmitted to the non-display cathode NCA, and thus light is not output from the non-display light emitting devices NED. Although it is described that the cathode voltage switch 520 is controlled by the control driver 400, embodiments are not limited thereto. As an example, the cathode voltage switch 520 may be controlled by a component other than the control driver 400. As an example, the cathode voltage switch 520 may be removed or modified in configuration such that the first cathode voltage line 521 is disconnected from the power supply 500.

Next, the non-display cathode NCA may be connected to the first cathode voltage line 521 in the non-display area NDA, as illustrated in FIG. 10. FIG. 11 is a cross-sectional view of a portion where the non-display cathode NCA and the first cathode voltage line 521 are connected, and particularly, a cross-sectional view taken along the D-D' line illustrated in FIG. 10.

That is, in a region where the non-display cathode NCA and the first cathode voltage line 521 are connected, the first cathode voltage line 521 may be provided on the substrate 101, the planarization layer 106 and the non-display bank NBK may be provided at an upper portion of the first cathode voltage line 521, and the non-display cathode NCA may be connected to the first cathode voltage line 521 through a contact hole provided in the planarization layer 106 and the non-display bank BK.

The first cathode voltage line 521 may include a first main cathode voltage line 521*a* and a first auxiliary cathode voltage line 521*b*, as illustrated in FIG. 11.

The first main cathode voltage line 521*a* may be formed with the light blocking plate LS, and the first auxiliary cathode voltage line 521*b* may be formed with the gate Gate.

However, the first cathode voltage line 521 may be formed of only one of the first main cathode voltage line 521*a* and the first auxiliary cathode voltage line 521*b*.

Finally, the non-display cathode NCA and the cathode CA may be apart from each other between the display area DA and the non-display area NDA, as illustrated in FIG. 10. That is, as described above, when the light emitting display apparatus is used by the user, the cathode voltage should be supplied to the cathode CA, but the cathode voltage should not be supplied to the non-display cathode NCA. Accordingly, the non-display cathode NCA and the cathode CA are separated.

In this case, the non-display cathode NCA may be connected to the first cathode voltage line 521 in the non-display area NDA, and the cathode CA may be connected to the second cathode voltage line 522 in the non-display area NDA. Embodiments are not limited thereto. As an example, the cathode CA may be connected to the second cathode voltage line 522 in the display area DA and/or the non-display area NDA.

The non-display cathode NCA and the cathode CA may be separated by various methods.

For example, the non-display cathode NCA and the cathode CA may be separated by an undercut structure UC provided between the non-display cathode NCA and the cathode CA as illustrated in FIG. 12, or may be separated on the same plane as illustrated in FIG. 13.

The undercut structure UC may be formed by various layers, but as illustrated in FIG. 12, the undercut structure UC may be formed by a passivation layer 105 and a planarization layer 106. That is, a buffer 102 may be provided on the substrate 101, the passivation layer 105 may be provided on the buffer 102, and the planarization layer 106 and the bank BK may be provided on the passivation layer 105. In this case, the undercut structure UC may be formed between the passivation layer 105 and the planarization layer 106 due to the difference in the degree to which the passivation layer 105 is etched and the planarization layer 106 is etched.

After the undercut structure UC is formed, when the cathode material forming the non-display cathode NCA and the cathode CA is deposited on the substrate 101, the cathode material may be cut off in the undercut structure UC.

When the undercut structure is thin, the cathode material may be connected, and thus, the undercut structure may be formed by etching two or more layers, for example, the buffer 102 and the passivation layer 105. In this case, the undercut structure UC may be formed thick, and thus the cathode material may be completely broken in the undercut structure UC.

Accordingly, the non-display cathode NCA and the cathode CA may be apart from each other with the undercut structure UC therebetween.

Moreover, after the buffer 102, the passivation layer 105, the planarization layer 106, and the bank BK are sequentially stacked on the substrate 101, the cathode material may be provided in the whole upper end of the bank BK.

Subsequently, the cathode material may be separated through the mask process, and as illustrated in FIG. 13, the non-display cathode NCA and the cathode CA may be apart from each other.

Figure 14:
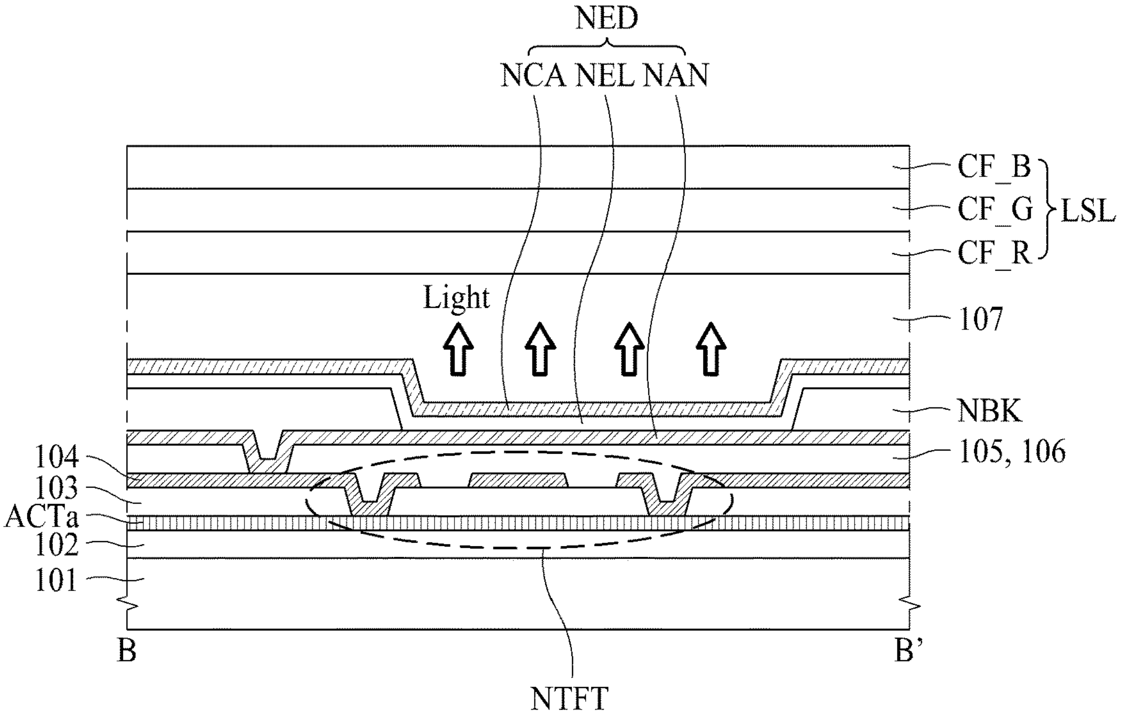
FIG. 14 is another example diagram illustrating a cross-sectional surface taken along line B-B' illustrated in FIG. 6.

FIG. 14 is another example diagram illustrating a cross-sectional surface taken along line B-B' illustrated in FIG. 6.

In the description referring to FIGS. 6 to 9, a light emitting display panel 100 using a bottom emission type was described as an example of a light emitting display panel applied to the present disclosure.

However, not only the light emitting display panel 100 using the bottom emission type but also a light emitting display panel 100 using a top emission type may be applied to the light emitting display apparatus according to the present disclosure.

That is, in the light emitting display panel 100 using the bottom emission type, light generated from the light emitting device ED may be output to the outside through the substrate 101, as illustrated in FIG. 7. In this case, light generated from the non-display light emitting device NED provided in the non-display area NDA may be also output to the outside through the substrate 101.

Therefore, as illustrated in FIGS. 8 and 9, the light blocking layer LSL for blocking light generated from the non-display light emitting device NED may be provided between the non-display light emitting device NED and the substrate 101.

However, light generated from the light emitting device ED provided in the display area of the light emitting display panel 100 using the top emission type may be output to the outside through the cathode CA and the encapsulation layer 107.

Therefore, light generated from the non-display light emitting device NED provided in the transistor non-display area NDA_T of the light emitting display panel 100 using the top emission type may also be output to the outside through the non-display cathode NCA and encapsulation layer 107, as illustrated in FIG. 14.

However, because the light generated from the non-display cathode NCA should not be output to the outside, a light blocking layer LSL may be provided at an upper end of the non-display cathode NCA and the encapsulation layer 107, as illustrated in FIG. 14.

As described above with reference to FIG. 8, the light blocking layer LSL may be formed of various materials capable of blocking light, for example, at least two color filters CF. In FIGS. 8 and 14, a light blocking layer LSL including a red color filter (F_R, a green color filter CF_G, and a blue color filter CF_B is illustrated.

That is, each of the cross-sectional views illustrated in FIGS. 14 and 8 illustrates a non-display transistor NTFT and a non-display light emitting device NED provided in the transistor non-display area NDA_T. Particularly, the cross-sectional view illustrated in FIG. 14 is a cross-sectional view of the light emitting display panel 100 using the top emission type, and the cross-sectional view illustrated in FIG. 8 is a cross-sectional view of the light emitting display panel 100 using the bottom emission type.

Therefore, the cross-sectional view illustrated in FIG. 14 has a structure similar to the cross-sectional view illustrated in FIG. 8, and the light blocking layer LSL is provided at an upper end of the non-display light emitting device NED in the cross-sectional view illustrated in FIG. 14. However, the light blocking layer LSL is provided at a lower end of the non-display light emitting device NED in the cross-sectional view illustrated in FIG. 8.

To provide an additional description, in the transistor non-display area NDA_T of the light emitting display panel 100 using a top emission type, as illustrated in FIG. 14, the buffer 102 may be provided on the substrate 101, the non-display active layer ACTa may be provided on the buffer 102, the gate insulation layer 103 may be provided on the non-display active layer ACTa, the gate layers 104 may be provided on the gate insulation layer 103, at least one of the passivation layer 105 and the planarization 106 may be provided on the gate layers 104, the non-display anode NAN may be provided on the at least one of the passivation layer 105 and the planarization 106, the non-display bank NBK may be provided in the outer portions of the non-display anode NAN, the non-display light emitting layer NEL may be provided on the non-display bank NBK and the non-display anode NAN, the non-display cathode NCA may be provided on the non-display light emitting layer NEL, the encapsulation layer 107 may be provided on the non-display cathode NCA, and a planarization and the light blocking layer LSL may be provided on the encapsulation layer 107.

Here, the substrate 101, the buffer 102, the insulation layer 103, the passivation layer 105, and the encapsulation layer 107 may correspond to the substrate 101, the buffer 102, the insulation layer 103, the passivation layer 105, and the encapsulation layer 107 described above with reference to FIG. 8.

Moreover, the non-display active layer ACTa, the gate insulation layer 103, and the gate layers 104 illustrated in FIG. 14 may configure the non-display transistor NTFT.

Moreover, the non-display anode NAN, the non-display light emitting layer NEL, and the non-display cathode NCA may configure the non-display light emitting device NED.

In this case, one of the gate layers 104 may be a gate of the non-display transistor NTFT, another may be a first terminal of the non-display transistor NTFT, and another may be a second terminal of the non-display transistor NTFT.

That is, as illustrated in FIG. 14, the non-display transistor NTFT may be connected to the non-display light emitting device NED. Particularly, the non-display transistor NTFT may be connected to the non-display anode NAN of the non-display light emitting device NED through a contact hole provided in at least one of the passivation layer 105 and the planarization layer 106, and the non-display light emitting device NED may be provided to overlap the non-display transistor NTFT. That is, the non-display light emitting device NED may be provided at an upper end or a lower end of the non-display transistor NTFT in the cross-sectional surface of the light emitting display panel 100, and FIG. 14 illustrates a light emitting display panel 100 provided with a non-display light emitting device NED at an upper end of the non-display transistor NTFT.

Except for the connection structure of the non-display transistor NTFT and the non-display light emitting device NED and the arrangement position of the light blocking layer LSL, the structure and function of the cross-sectional surface illustrated in FIG. 14 is the same as the structure and function of the cross-sectional surface illustrated in FIG. 8. Accordingly, a detailed description of the structure and function of the cross-sectional surface illustrated in FIG. 14 is omitted.

Moreover, the arrangement structure of the light blocking layer LSL illustrated in FIG. 14 maybe equally applied to the cross-sectional surface taken along line C-C' of FIG. 6.

For example, in the line non-display area NDA_L of the light emitting display panel using the bottom emission type, as illustrated in FIG. 9, the light blocking layer LSL may be provided at an upper end of the gate control signal line GCL and the non-display light emitting device NED may be provided on the light blocking layer LSL. Accordingly, the light generated from the non-display light emitting device NED is blocked by the light blocking layer LSL, and thus may not be output in a direction toward the substrate 101.

However, in the line non-display area NDA_L of the light emitting display panel using the top emission type, the non-display light emitting device NED may be provided at an upper end of the gate control signal line GCL and the light blocking layer LSL may be provided at an upper end of the non-display light emitting device NED. Accordingly, the light generated from the non-display light emitting device NED is blocked by the light blocking layer LSL, and thus may not be output in a direction toward the encapsulation layer 107.

In the light emitting display apparatus according to the present disclosure, as described above, even when light is generated from the non-display light emitting device NED, the light is blocked by the light blocking layer LSL and may not be output to the outside.

That is, in the light emitting display apparatus according to the present disclosure, the non-display light emitting devices NED can only be used to measure or test whether the gate driver 200 operates normally.

To this end, the non-display cathode NCA and the cathode CA may be apart from each other and may receive a cathode voltage through different lines. Therefore, when the non-display light emitting devices NED do not need to be driven, the cathode voltage may not be supplied to the non-display cathode NCA, and accordingly, light may not be output from the non-display light emitting devices NED.

When light is output from the non-display light emitting devices NED during the test process of the light emitting display apparatus, the temperature of the gate control signal lines GCL which are connected to the non-display light emitting devices NED or overlap the non-display light emitting devices NED and the temperature of the non-display transistors NTFT which overlap the non-display light emitting devices NED can quickly increase. Accordingly, it may be quickly determined whether the gate control signal lines GCL and the non-display transistor NTFT are normally driven at a high temperature.

Therefore, according to the present disclosure, it may be quickly determined whether the gate driver 200 is normally driven at a high temperature.

In this case, if the non-display transistor NTFT or the gate control signal line GCL is not normally driven, light may not be output from the non-display light emitting device NED overlapping the non-display transistor NTFT or the gate control signal line GCL which are not normally driven.

The non-display light emitting device NED in which light is not output may be identified through various cameras or magnifiers.

It may be determined that the non-display transistor NTFT or the gate control signal line GCL overlapping the non-display light emitting device NED, which does not output light, does not operate normally.

That is, according to the present disclosure, among the non-display transistors NTFT and gate control signal lines GCL which are provided in the gate driver 200, a non-display transistor NTFT or a gate control signal line GCL, which does not operate normally, can be quickly and simply identified. Accordingly, whether the gate driver 200 is defective and a defective non-display transistor NTFT or a defective gate control signal line GCL can be quickly and accurately determined.

According to the present disclosure, the temperature of the non-display area provided with the gate driver can rapidly increase by the non-display light emitting devices in the aging process for testing the quality of the light emitting display apparatus, and thus whether the gate driver 200 is defective can be quickly and accurately determined.

Particularly, according to the present disclosure, non-display transistors provided in the gate driver may be connected to non-display light emitting devices. In this case, light may not be normally output from the non-display light emitting device connected to the non-display transistor which is not normally driven. Accordingly, a non-display transistor which is not normally driven can be quickly and accurately determined.

Accordingly, in the manufacturing process of the light emitting display apparatus, it is possible to quickly and accurately determine whether the light emitting display apparatus is defective.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A light emitting display apparatus, comprising:

a light emitting display panel including a display area provided with pixels including light emitting devices and a non-display area provided outside the display area, a gate driver for supplying gate pulses to gate lines provided in the light emitting display panel, the gate driver provided in the non-display area, and a non-display light emitting device is connected to a non-display transistor provided in the gate driver, wherein the non-display light emitting device overlaps the non-display transistor.

2. The light emitting display apparatus of claim 1, wherein a light blocking layer blocking light is provided at an upper end or a lower end of the non-display light emitting device.

3. The light emitting display apparatus of claim 1, wherein:

a non-display cathode of the non-display light emitting device is connected to a first cathode voltage line extending from a power supply; and a cathode of the light emitting devices is connected to a second cathode voltage line extending from the power supply.

4. The light emitting display apparatus of claim 3, wherein the first cathode voltage line is connected to or separated from the power supply by a cathode voltage switch connected to the first cathode voltage line.

5. The light emitting display apparatus of claim 3, wherein the first cathode voltage line extends from a first cathode voltage generator of the power supply, and the second cathode voltage line extends from a second cathode voltage generator of the power supply.

6. The light emitting display apparatus of claim 1, wherein a non-display cathode of the non-display light emitting device and a cathode of the light emitting devices are apart from each other between the display area and the non-display area.

7. The light emitting display apparatus of claim 6, wherein the non-display cathode and the cathode are separated by an undercut structure or are separated on a same plane.

8. The light emitting display apparatus of claim 6, further comprising a buffer on which a display transistor for driving the pixels and the non-display transistor are provided, a passivation layer covering the display transistor and the non-display transistor and a planarization layer covering the passivation layer, the light emitting devices and the non-display light emitting device being provided on the planarization layer, wherein the undercut structure is formed between the buffer, the passivation layer and the planarization layer.

9. A light emitting display apparatus, comprising:

a light emitting display panel including a display area provided with pixels including light emitting devices and a non-display area provided outside the display area, a gate driver for supplying gate pulses to gate lines provided in the light emitting display panel, the gate driver provided in the non-display area, and a non-display light emitting device is connected to a non-display transistor provided in the gate driver, wherein each of all non-display transistors in the gate driver is provided with a respective non-display light emitting device.

10. The light emitting display apparatus of claim 9, wherein one non-display light emitting device is commonly connected to two or more non-display transistors adjacent and connected to each other, and overlaps the two or more non-display transistors.

11. The light emitting display apparatus of claim 1, wherein:

the gate driver includes stages connected to the pixels;

gate control signal lines for supplying gate control signals to the stages are provided in the non-display area; and each of the stages includes the non-display light emitting device connected to the non-display transistor and a respective non-display light emitting device overlapping the gate control signal lines.

12. The light emitting display apparatus of claim 11, wherein each of the non-display light emitting devices overlapping the gate control signal lines is connected to any one of the gate control signal lines.

13. The light emitting display apparatus of claim 12, wherein:

a kth non-display light emitting device overlapping the gate control signal lines in a kth stage among the stages is connected to a first gate control signal line among the gate control signal lines; and a k+1th non-display light emitting device overlapping the gate control signal lines in a k+1th stage among the stages is connected to a second gate control signal line among the gate control signal lines, wherein k is a natural number.

14. The light emitting display apparatus of claim 11, wherein the number of the stages is greater than the number of the gate control signal lines, and at least two non-display light emitting devices overlapping the gate control signal lines and provided in different stages are connected to one gate control signal line.

15. The light emitting display apparatus of claim 11, wherein the gate control signals include a gate clock and a power needed at the stages.

16. The light emitting display apparatus of claim 1, wherein:

the non-display light emitting device is a first non-display light emitting device, the gate driver includes stages connected to the pixels;

gate control signal lines for supplying gate control signals to the stages are provided in the non-display area; and each of the gate control signal lines overlaps one second non-display light emitting device.

17. The light emitting display apparatus of claim 16, wherein:

the gate control signal lines extend in parallel with each other in a first direction; and the second non-display light emitting devices overlapping the gate control signal lines extend in parallel with each other in the first direction.

18. The light emitting display apparatus of claim 17, wherein one second non-display light emitting device is provided continuously in all stages.

19. The light emitting display apparatus of claim 2, wherein the light blocking layer includes at least two color filters among different types of color filters provided in the display area.

20. The light emitting display apparatus of claim 1, wherein the non-display light emitting device overlaps the non-display transistor in a plan view.

* * * * *